United States Patent
O'Shea

(10) Patent No.: US 10,464,624 B2
(45) Date of Patent: Nov. 5, 2019

(54) PADDED LAMINATE BICYCLE SEAT

(71) Applicant: Patrick Brendon O'Shea, Del Mar, CA (US)

(72) Inventor: Patrick Brendon O'Shea, Del Mar, CA (US)

(73) Assignee: Patrick B. O'Shea, Del Mar, CA (US)

( * ) Notice: Subject to any disclaimer, the term of this patent is extended or adjusted under 35 U.S.C. 154(b) by 0 days.

(21) Appl. No.: 15/913,694

(22) Filed: Mar. 6, 2018

(65) Prior Publication Data
US 2019/0276104 A1 Sep. 12, 2019

(51) Int. Cl.
*B62J 1/26* (2006.01)
*B62J 1/08* (2006.01)
*B62J 1/22* (2006.01)
*B32B 27/28* (2006.01)
*B32B 27/08* (2006.01)

(52) U.S. Cl.
CPC ............... *B62J 1/26* (2013.01); *B32B 27/08* (2013.01); *B32B 27/283* (2013.01); *B62J 1/08* (2013.01); *B62J 1/22* (2013.01); *B32B 2250/02* (2013.01); *B32B 2383/00* (2013.01); *B32B 2605/00* (2013.01)

(58) Field of Classification Search
CPC ........... B62J 1/26; B32B 27/08; B32B 27/283
See application file for complete search history.

(56) References Cited

U.S. PATENT DOCUMENTS

| | | | | |
|---|---|---|---|---|
| 6,106,059 A | * | 8/2000 | Minkow | .................. B62J 1/002 297/214 X |
| 2003/0175497 A1 | * | 9/2003 | Kobe | ......................... C09J 7/26 428/317.9 |

* cited by examiner

*Primary Examiner* — Anthony D Barfield
(74) *Attorney, Agent, or Firm* — Plager Schack LLP

(57) ABSTRACT

A padding structure for providing softness and support may include a laminate having a lower, firm layer and an upper, soft layer operatively attached to the lower, firm layer, wherein the upper, soft layer has a durometer value of from about sub-00 to about 05; and the lower, firm layer has a durometer value of from about 05 to about 10. The padding structure may be used to make a bicycle seat, which further includes a seat base, a top cover, and a seat frame.

7 Claims, 3 Drawing Sheets

PADDED LAMINATE BICYCLE SEAT

BACKGROUND

The embodiments herein relate generally to bicycles, and more particularly, to a padded, laminate bicycle seat comprising layers of padding with different durometer.

Sitting on a seat or saddle, such as a bicycle seat or equestrian saddle, for extended periods of time can cause soft tissue compression, bone bruises, pain, soreness, soft tissue hypoxia and/or numbness in the perineal area, pelvic sit bone region, pubic bone, genitals, and soft tissues. The above may results in sexual dysfunction, erectile dysfunctions, and numbness and decreased blood flow to the perineal area.

Conventional seats and saddles may include padding, but the conventional padding is cheap, inferior foam and gel-like foam materials, which suffer from compression and fail to provide the long term comfort and support, leading to greater incidence of pain, numbness, soft tissue problems, and deep bone bruising sensations that last for several days.

Therefore, what is needed is a padding material, such as those used for bike seats or saddles, wherein the padding material comprises layers of padding material that vary in durometer value to provide dynamic-functional cushioning, while absorbing, distributing, and dampening forces from direct compression, vibrations, and bumps. Thus, what is needed is a padding material that pads, distributes forces, and provides support all at the same time.

SUMMARY

Some embodiments of the present disclosure include a padding structure for providing softness and support may include a laminate having a lower, firm layer and an upper, soft layer operatively attached to the lower, firm layer, wherein the upper, soft layer has a durometer value of from about sub-00 to about 05; and the lower, firm layer has a durometer value of from about 05 to about 10. The padding structure may be used to make a bicycle seat, which further includes a seat base, a top cover, and a seat frame.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a padding material for, for example, bicycle seats and saddles and may comprise the following elements. This list of possible constituent elements is intended to be exemplary only, and it is not intended that this list be used to limit the method and formulation of the present application to just these elements. Persons having ordinary skill in the art relevant to the present disclosure may understand there to be equivalent elements that may be substituted within the present disclosure without changing the essential function or operation of the product or method.

a. Laminate Padding
b. Lower, Firm Layer
c. Upper, Soft Layer

The various elements of the product and method of the present disclosure may be related in the following exemplary fashion. It is not intended to limit the scope or nature of the relationships between the various elements and the following examples are presented as illustrative examples only.

By way of example, and referring to FIGS. 1-5, some embodiments of the present disclosure include a padding structure for providing softness and support, the padding structure comprising a laminate 18 comprising a lower, firm layer 20 and an upper, soft layer 22 operatively attached to the lower, firm layer 20. The upper, soft layer 22 may have a durometer value greater than that of the lower, firm layer 20. For example, the soft layer 22 may have a durometer value of 00, while the firm layer 20 may have a durometer value of 05. In embodiments, the padding structure may include additional laminate layers, depending on use of the padding structure.

In embodiments, the padding structure may further comprise a base to which the laminate 18 is operatively attached, such that the lower, firm layer 20 is positioned adjacent to the base, and a top cover layer encasing at least a portion of the base and the laminate 18.

Figure 1:
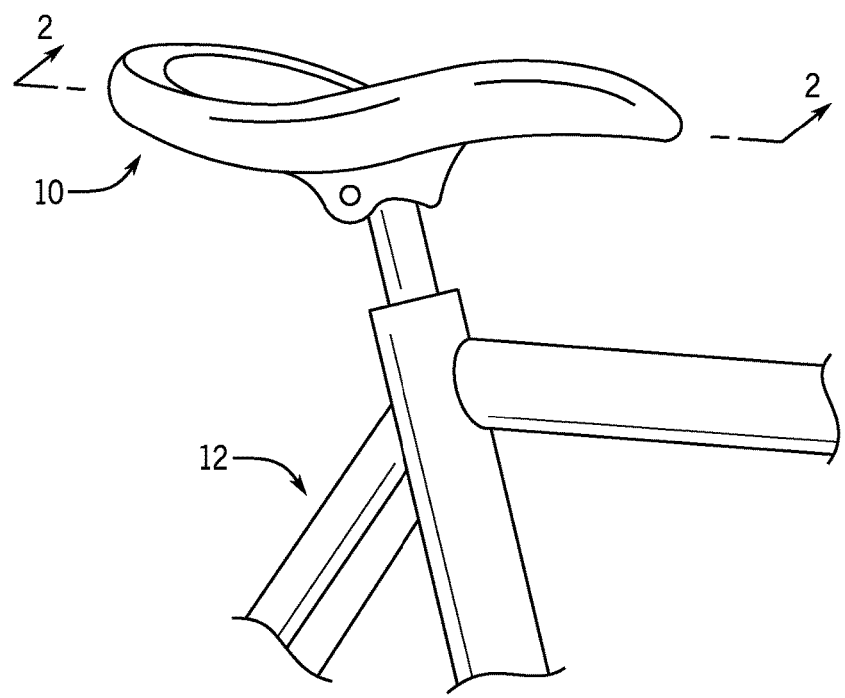
FIG. 1 is a perspective view of one embodiment of the present disclosure.
Figure 2:
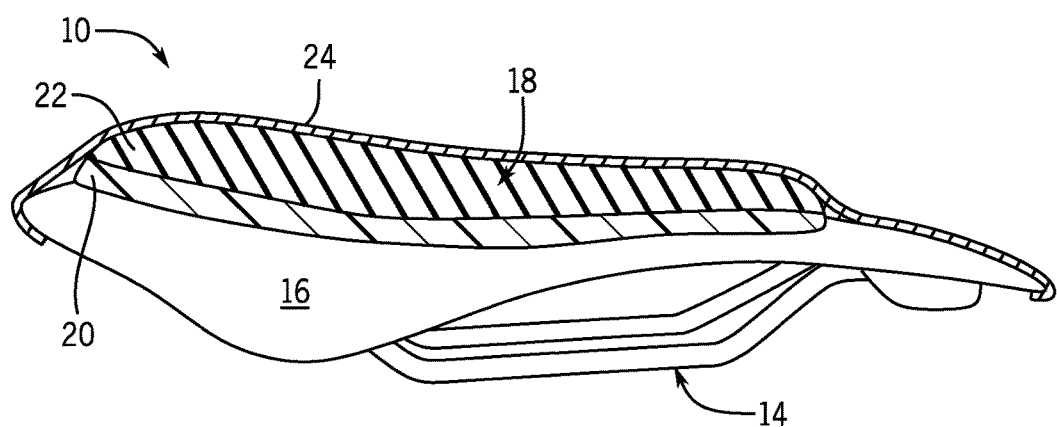
FIG. 2 is a cross-sectional view of one embodiment of the present disclosure, taken along line 2-2 in FIG. 1.
Figure 3:
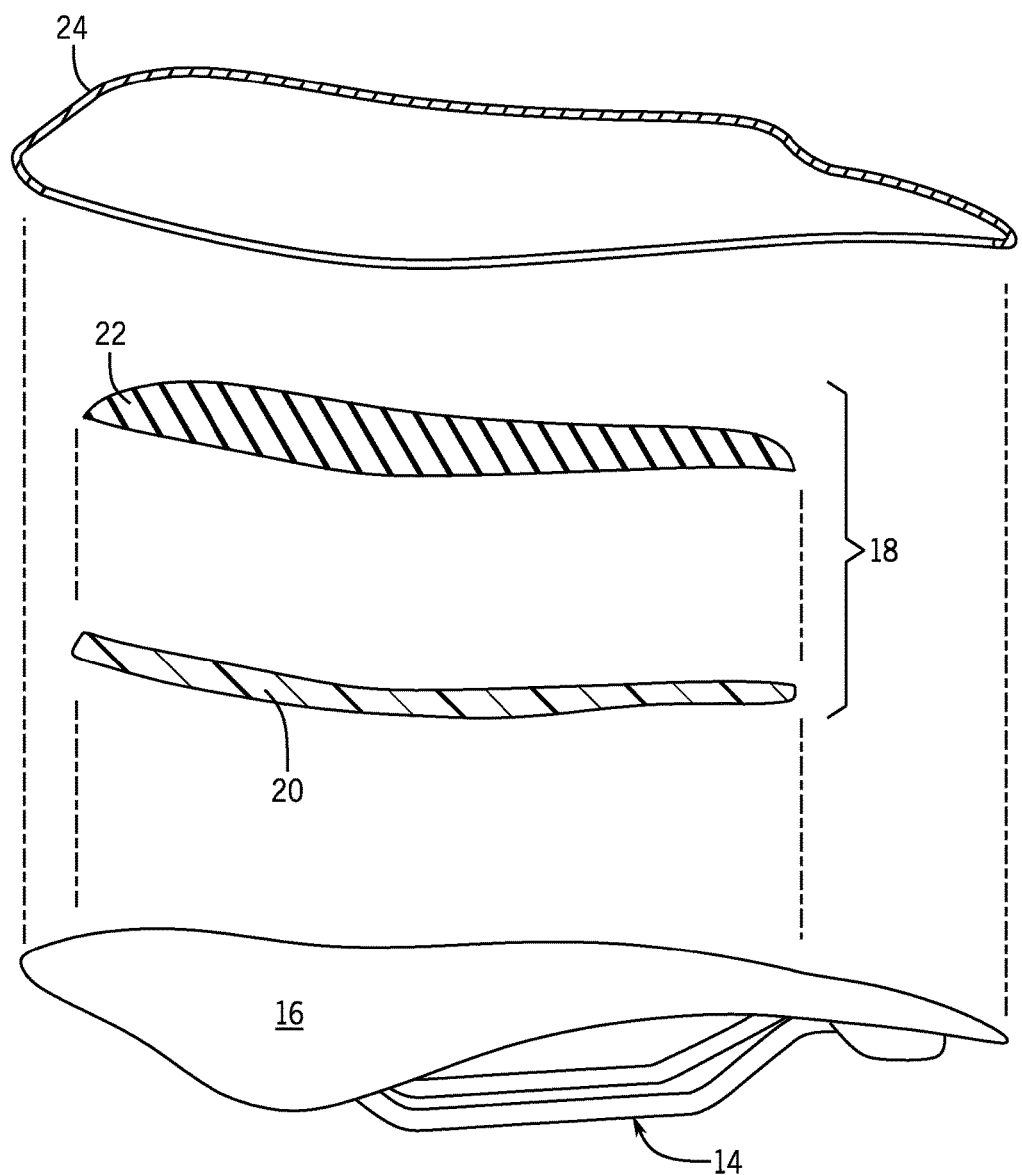
FIG. 3 is an exploded cross-sectional view of one embodiment of the present disclosure.
Figure 4:
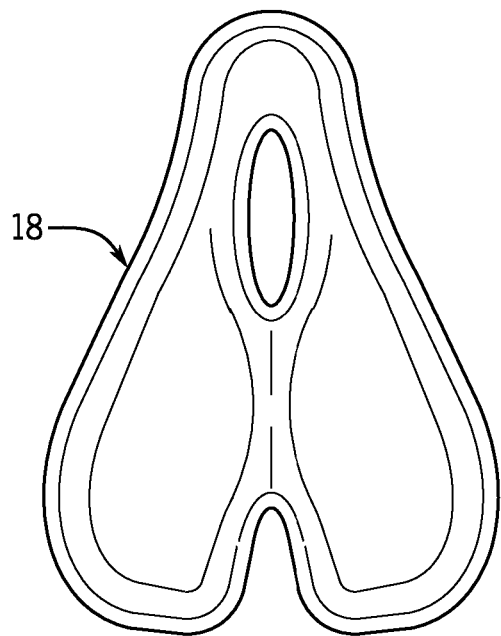
FIG. 4 is a top plan view of one embodiment of the present disclosure.
Figure 5:
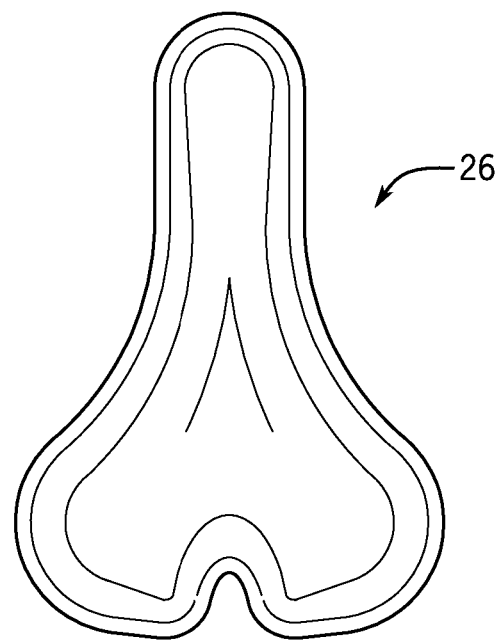
FIG. 5 is a top plan view of one embodiment of the present disclosure.

For example, in particular embodiments, the padding structure may be used to create a bicycle seat 10, as shown in the Figures. The bicycle seat 10 may comprise a seat frame 14 designed to attach to the bicycle 12, a seat base 16 attached to the seat frame, a laminate 18 attached to the seat base 16, and a seat cover 24 encasing the laminate 18 and at least a portion of the seat base 16. The laminate 18 may comprise an upper, soft layer 22 and a lower, firm layer 20. As shown in FIGS. 4 and 5, the laminate 18 may have varying shapes, based on a user's preferences. For example, as shown in FIG. 4, the laminate 18 may include a cutout extending therethrough, which may limit perineal pressure. Alternatively, the laminate 26 may be substantially narrower at one end without a cutout.

The laminate layers (i.e., the soft layer 22 and the firm layer 20) may each be made of organo-functional siloxanes, which are a class of chemical compounds of silicon, oxygen, and hydrogen based on the repeating structural unit of $H_2$—SiO. This class of highly complex polymers includes silicone as $R_2$—SiO, wherein R is an organic group, as a type of liquid silicone rubber (LSR). The specific type of silicon elastomers used in the laminate layers may be a platinum-cured, Shore A, LSR of varying durometers.

Each of the laminate layers may comprise a two-part blend of the chosen LSR durometer (softness rating), referred to as Part A, and Part B, wherein Part A and Part B may be combined in a 1:1 ratio. Multiple layers of different durometers may be used, but the formula, process, and mixing ratios may be the same for each individual layer. Thus, the only difference between the distinct layers may be the specific durometer used.

Each laminate 18 is stacked from a softest layer on top (from sub-00 to about 05 durometer range), down to the firmest layer on the seat base 16 (from about 05 to about 10 durometer range). The layers may be self-adhering to produce a laminated padding structure, which may create an extremely dynamic and functional padding. However, in embodiments, the layers may be attached to one another using any known adhesives or fastening methods.

While each of the laminate layers will be fitted to the seat base 16 and, thus, may have the same length and width, the top-most and softest layer 22 may have a larger thickness than the bottom, firm layer 20. For example, the ratio of top layer to bottom layer in terms of thickness may be from about 2:1 to about 10:1, depending on seat type. The length of each layer may be from about 200 mm to about 330 mm, and the length of the soft layer 22 may be the same or slightly shorter than the firm layer 20. The width of each layer may be from about 100 mm to about 200 mm, wherein the width of all layers is the same. The height may be from about 1 mm to about 30 mm per layer, wherein from about 2 to about 5 layers may be used to make the laminate 18. The shape of the layers may mimic the shape of the seat base 16, wherein the shape is substantially triangular, optionally with a central cut-out area, and a narrow front nose back to a much wider base.

The laminate 18 may be manufactured using CAD files to create each layer, and low volume injection molding (LVIM) or production tooling to physically make the padding. The specific durometer being produced may be mixed at a ratio of about 1:1 just prior to being injected into the tool's negative space, forming the LSR padding in the triangular, bike seat shape with an optional cutout section for the pubic bone, genital and perineal regions, and between the sit bones.

In more detail, creating each laminate layer may comprise the following steps. Uncured liquid silicone may be initially separated into two containers, Compound A, which holds the base-forming material, and Compound B, which contains a catalyst. A metering unit may automatically release the two substances at a constant 1:1 ratio of the exact amount need to fill the mold cavity. The material may be injected into the mold cavity, and a layer may be produced in accordance with the settings for temperature, pressure, injection rate, and cycle time. The temperature ranges for each step may be about 20-30° C. in the IM machine, increase up to 140-200° C. during injection, and cooled to 80-100° C. for curing the mold briefly before being ejected.

The LSR materials may be vulcanized at room temperature and the mixing of part A and part B may be from a few minutes up to 6 minutes. The LSR materials may be poured into individual molds in various volumes of from about 2 oz to about 12 oz. LSR vulcanization may take up to about 30 minutes for the soft layer (durometer value around 00) and up to about 6 to 8 hours for the firm layer (durometer value of from about 05 to about 10).

The seat cover 24 may be made of any suitable or desired materials and, in some embodiments, comprises an imitation leather material. The seat cover 24 may be attached to the laminate 18 and the seat base 16 using any known fastening methods, such as by using an adhesive.

The seat base 16 may comprise any suitable or desired material and, in some embodiments, comprises nylon plastic or carbon fiber. The seat base 16 may include a central cut-out titanium or other metal rails that attach the seat base 16 to the seat bracket of the bike seat stem on the bicycle 12. The seat base 16 may have any desired length, width, and weight and, in some embodiments, the length may be from about 200 mm to about 330 mm; the width may be from about 100 mm to about 200 mm, and the weight may vary by model and may typically range from about 50 grams to about 500 grams.

While the padding structure is primarily described above as being used to create a bicycle seat, the padding structure may also be used to form other products, such as equestrian saddles, handlebar padding, and the like. Additionally, in some embodiments, the laminate 18 with a cover 24 may form a portable seat, which may be used to attach to a standalone seat, such as a spin bike seat or a rental bike seat, wherein the standalone seat attaches to the existing seat using a fastener, such as a hook and loop fastener.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A padding structure for providing softness and support, the padding structure comprising:
    a laminate comprising a lower, firm layer and an upper, soft layer operatively attached to the lower, firm layer, wherein:
        the upper, soft layer is made from a first liquid silicone rubber blend vulcanized for no more than 30 minutes that has a durometer value of from about sub-00 to about 05; and
        the lower, firm layer is made from a second liquid silicone rubber blend vulcanized for six to eight hours that has a durometer value of from about 05 to about 10.

2. The padding structure of claim 1, further comprising:
    a base to which the laminate is operatively attached, such that the lower, firm layer is positioned adjacent to the base; and
    a top cover layer encasing at least a portion of the base and the laminate.

3. The padding structure of claim 1, wherein a ratio of the thickness of the soft, upper layer to the lower, firm layer is from about 2:1 to about 10:1.

4. A padded laminate bicycle seat comprising:
    a seat frame designed to attach to a bicycle;
    a seat base attached to the seat frame;
    a laminate attached to the seat base, the laminate comprising an upper, soft layer and a lower, firm layer; and
    a seat cover encasing the laminate and at least a portion of the seat base,
    wherein:
        the upper, soft layer is made from a first platinum-cured, Shore A liquid silicone rubber blend vulcanized for no more than 30 minutes that has a durometer value of from about sub-00 to about 05; and
        the lower, firm layer is made from a second platinum-cured, Shore A liquid silicone rubber blend vulcanized for six to eight hours that has a durometer value of from about 05 to about 10.

5. The padded laminate bicycle seat of claim 4, wherein a ratio of the thickness of the soft, upper layer to the lower, firm layer is from about 2:1 to about 10:1.

6. The padded laminate bicycle seat of claim 4, wherein:
a length of each of the upper, soft layer and the lower, firm layer is from about 200 mm to about 330 mm;
a width of each of the upper, soft layer and the lower, firm layer is from about 100 mm to about 200 mm; and
a height of each of the upper, soft layer and the lower, firm layer is from about 1 mm to about 30 mm per layer, wherein the upper, soft layer has a larger height than the lower, firm layer.

7. The padded laminate bicycle seat of claim 4, wherein the laminate comprises additional padding layers.

* * * * *